US008168324B2

(12) United States Patent
Streuer et al.

(10) Patent No.: US 8,168,324 B2

(45) Date of Patent: May 1, 2012

(54) GRIP ARRANGEMENT FOR A BATTERY BOX

(75) Inventors: Peter Streuer, Hannover (DE); Andreas Schulze-Beckinghausen, Wunstorf (DE)

(73) Assignee: VB Autobatterie GmbH & Co. KGaA, Hannover (DE)

(*) Notice: Subject to any disclaimer, the term of this patent is extended or adjusted under 35 U.S.C. 154(b) by 238 days.

(21) Appl. No.: 12/528,801

(22) PCT Filed: Feb. 26, 2008

(86) PCT No.: PCT/EP2008/001509

§ 371 (c)(1), (2), (4) Date: Feb. 5, 2010

(87) PCT Pub. No.: WO2008/104364

PCT Pub. Date: Sep. 4, 2008

(65) Prior Publication Data

US 2010/0143776 A1 Jun. 10, 2010

(51) Int. Cl.
*H01M 2/10* (2006.01)

(52) U.S. Cl. ......................... 429/187; 429/100; 429/122

(58) Field of Classification Search .................. 429/187, 429/163, 100, 96, 122

See application file for complete search history.

(56) References Cited

U.S. PATENT DOCUMENTS

| | | | | |
|---|---|---|---|---|
| 5,144,719 | A | 9/1992 | Arthur | |
| 6,428,927 | B1 * | 8/2002 | Kump et al. | 429/187 |
| 2007/0155232 | A1 * | 7/2007 | Burris et al. | 439/578 |
| 2008/0108241 | A1 * | 5/2008 | Kocher et al. | 439/345 |

FOREIGN PATENT DOCUMENTS

| | | |
|---|---|---|
| DE | 7135447 | 9/1971 |
| DE | 8904628.5 | 4/1989 |
| EP | 0355854 * | 2/1990 |

* cited by examiner

*Primary Examiner* — Raymond Alejandro

(74) *Attorney, Agent, or Firm* — Boardman & Clark LLP

(57) ABSTRACT

A grip arrangement for a battery box is provided. The grip arrangement includes a grip element which extends along a longitudinal axis. A cord passage is provided in the grip element, the cord passage includes a tapered section and is oriented along a passage axis provided transverse to the longitudinal axis. A locking chamber is provided in the grip element. An elongate slot provided offset from the cord passage is coupled to the locking chamber, the elongate slot is formed by an indent opened on one side of the locking chamber which extends parallel to the longitudinal axis toward the cord passage and transverse to the passage axis of the cord passage. A cord having an end piece is received by the cord passage and the elongate slot, wherein the end piece is received within the locking chamber and the cord is deflected twice from the cord passage through the elongate slot to the locking chamber.

6 Claims, 2 Drawing Sheets

GRIP ARRANGEMENT FOR A BATTERY BOX

FIELD OF THE INVENTION

The invention relates to a grip arrangement for battery boxes having a grip element which can be connected to at least one end of a cord which can be attached to the battery box, in such a way that an end of the cord provided with an endpiece is guided through a laterally open cord passage in the grip element, said cord passage being provided with a tapered section and being oriented with its passage axis transversely with respect to the longitudinal axis of the grip element, and in such a way that the endpiece is held in a locking chamber.

The invention also relates to a lead storage battery having a battery box and two grip arrangements on opposite side walls of the battery box.

BACKGROUND

FR 2 556 136 A1 discloses a battery box cord which has an endpiece at one end and a locking element at the other end. The locking element has an opening which is sufficiently large for the insertion of the endpiece and a slot for the insertion of the battery cord and a locking chamber for the endpiece is adjacent to said opening. in order to lock the battery box cord, the endpiece is inserted into the opening and the adjacent battery cord is inserted into the slot, and the endpiece is pulled into the locking chamber and secured there by pulling the battery cord. The direction of the battery cord of the endpiece in the locking chamber remains the same.

A similar battery box cord for a storage battery housing with an integrally molded-on gripping means is described in DE 75 38 942 U1. In this document, the endpiece is also secured to the battery box cord in a closure element.

FR 2 565 411 A1 discloses a battery box cord equipped with a closure, in which the endpiece of the battery box cord is guided through a bore transversely with respect to the direction of extent of the closure element and the twine which is attached thereto and inserted into an adjacent bore arranged locking chamber. A slot is provided between the bore and the locking chamber. The twine is deflected by the bore through the slot by 90° with respect to the locking chamber, and as a result further secured.

A corresponding embodiment of a battery box cord is also disclosed in DE 29 50 629 B1.

DE 97 35 447 U describes a starter battery having a gripping means which is integrally formed on the battery container. The gripping means has on the side in each case a bore for guiding through a twine for carrying the storage battery. Adjacent to the bore, in each case an elastically deformable slotted hole is provided for clamping in and locking the twine. An endpiece which is connected to the twine rests on the slotted hole. The twine is deflected by 90° by the slotted hole and by 90° by the adjacent bore respectively, i.e. by a total of 180°, and is secured in this way.

WO 01/41236 A1 describes a grip arrangement for battery boxes having a grip element which has a bore which is sufficiently large to lead through an endpiece of a twine and a bore which is adapted thereto and has an adjacent locking chamber which is suitable for receiving the endpiece. The two adjacent bores are connected to one another by a slot which is suitable for guiding through the twine. In order to lock the twine to the gripping element, the endpiece is firstly plugged through the large bore, and the twine is then pushed laterally into the adjacent bore. The twine is then pulled back in the smaller bore until the endpiece is seated in the receptacle chamber.

DE 88 05 405 U has a similar grip arrangement for battery boxes, in which grip arrangement just one bore, which is suitable for guiding through an endpiece of a twine, is provided in the grip element. A locking chamber for receiving the endpiece in the grip element is provided adjacent to this bore. In order to secure the cord to the grip element, the endpiece is guided through the bore and rotated through 180° in order to be inserted into the locking chamber. This deflection of the twine is intended to ensure a secure seat of the cord on the grip element.

DE 103 23 024 83 discloses a battery box in which the through opening is embodied as an elongate hole which extends in a longitudinal direction and through which a loop of the cord section of the carrying grip element can be guided. In each case a clamping locking element for receiving the cord section is arranged on the battery box, underneath the opening of the elongate hole in the region of the ends of the elongate hole. The clamping locking elements each have an insertion opening which opens into a guide opening for the cord section and has, opposite the guide opening, an insertion side, which is open in order to permit the cord sections to be inserted, and a constriction for receiving the cord section in a locking fashion in the adjacent guide opening. The open insertion side points in the longitudinal direction parallel to the elongate hole, viewed from the elongate hole in the direction of the assigned elongate hole end.

As a result of this arrangement, the loop of the cord section of a battery box cord which is enclosed in an annular shape and has a grip section and a cord section can easily be guided through the elongate hole and locked by simple pulling up. During the pulling up process, the cord section is automatically pulled through the insertion opening into the adjacent guide opening and held in the guide opening by the constriction in the insertion opening.

This described measure disadvantageously requires modification of the battery boxes.

During the automatic mounting of vehicle batteries with robots, there is the problem that said batteries are gripped on the battery box cord by the robot arms and moved to the installation positions. Accelerations of up to 6 G occur in the process.

SUMMARY OF THE DESCRIPTION

Taking this as a basis, the object of the present invention is to provide an improved grip arrangement for battery boxes with a grip element, which arrangement can be used universally without modification of a battery box, can be mounted quickly and easily and can also be subjected to large loads.

The object is achieved with the grip arrangement of the type mentioned at the beginning in that adjacent to the locking chamber, a slot which prevents an endpiece which has been inserted into the locking chamber from being pulled through is provided, which slot extends in its longitudinal direction from the locking chamber in the direction of the cord passage, and the indent of said slot runs transversely with respect to the passage axis of the cord passage, and its indent opening for the insertion of the cord also runs transversely with respect to the passage axis of the cord passage, with the result that a cord which is guided through the cord passage has to be deflected twice starting from the cord passage in order to be inserted into the slot, and said cord is directed into the locking chamber through the slot.

Since the indent of the slot runs transversely with respect to the passage axis of the cord passage, the cord which is deflected by the cord passage is held by the upper slot wall. The arrangement also prevents the endpiece from being pulled out of the locking chamber under tensile loading. On the contrary, a force acting essentially in the longitudinal direction is applied to the cord under tensile loading, which force pulls the endpiece against the wall of the locking chamber which is adjacent to the slot and secures it there. By configuring the slot in such a way that the central axis of a cord inserted there is offset somewhat from alignment with, the cord passage, it is possible to additionally bring about a situation in which the cord is pulled further into the slot when loading is applied, and it therefore holds the endpiece in the locking chamber even more securely.

At any rate it is decisive that the double deflection, of the cord when it is inserted into the slot and the resulting securement of the endpiece in the locking chamber exclusively through structural configuration of the grip element provides a considerably improved load-bearing capacity without structural measures having to be performed on the battery box. The endpiece with the cord attached thereto can also be quickly and easily clamped in the grip element. For this purpose, the endpiece is easily directed into the locking chamber, the adjacent cord section plugged into the slot and the cord clipped into the cord passage via the lateral opening in the cord passage.

The grip arrangement can be clamped in on one side or on both sides. In the embodiment in which it is clamped in on one side, the second end of the cord is securely connected to the grip element, for example by bonding or welding.

In the embodiment in which the grip arrangement is clamped in on both sides, the grip element has a cord passage with an assigned slot and an adjacent locking chamber at each of its two opposite ends in its longitudinal axis in order to clamp the two ends of the cord into the grip element.

In order to improve the stability while at the same time reducing the weight and material, it is advantageous if the grip element has reinforcement ribs extending along the longitudinal axis and transversely with respect to the longitudinal axis.

A lead storage battery which is equipped with two such grip arrangements and has a battery box has, on two side walls of the battery box lying opposite one another, guide holes for receiving the cord of a grip arrangement. At least one endpiece of the cord is then guided through the guide holes in order to connect the cord to the battery box. The at least one endpiece is then secured to the grip element, as explained above.

BRIEF DESCRIPTION OF THE DRAWINGS

The invention is explained in more detail below by means of exemplary embodiments and with reference to the appended drawings, in which.

DETAILED DESCRIPTION

Figure 1:
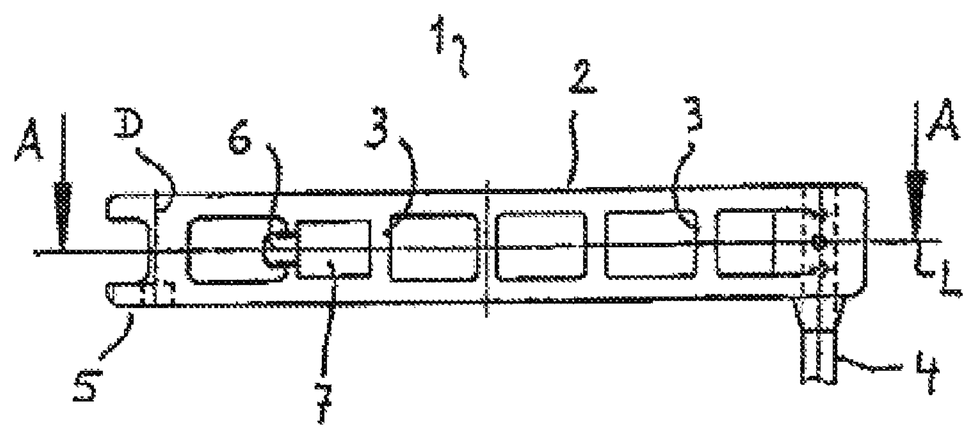
FIG. 1 shows a side view of a first grip arrangement, which can be clamped in on one side, for battery boxes.

FIG. 1 shows a side view of a first embodiment of a grip arrangement 1 having a grip element 2 which has reinforced ribs 3 extending transversely with respect to the longitudinal axis.

On the right-hand side of the grip element 2, the end of a cord 4 is securely connected to the grip element 2, for example by bonding or welding. The other end of the cord 4 is provided with an endpiece which is deflected forward by 90° in the direction of the viewer and by 90° to the right when it is guided through a cord passage 5 on the illustrated left hand outer edge of the grip element. The cord end which is deflected in this way is guided through a slot 6 into a locking chamber 7 in order to hold the endpiece in the locking chamber. The slot 6 opens in the locking chamber for this purpose. The longitudinal direction of the slot 6 is aligned with the longitudinal direction L of the grip element 2. The indent of the slot 6 is, as can be seen from FIG. 1, oriented transversely with respect to the passage axis D of the cord passage 5. In this way, a cord which is guided through the cord passage 5 and the slot 6 is held securely by means of an endpiece 8 which has been inserted into the locking chamber, and the grip arrangement 1 is stable even in the case of considerable acceleration of a battery box suspended from the grip arrangement 1.

Figure 2:
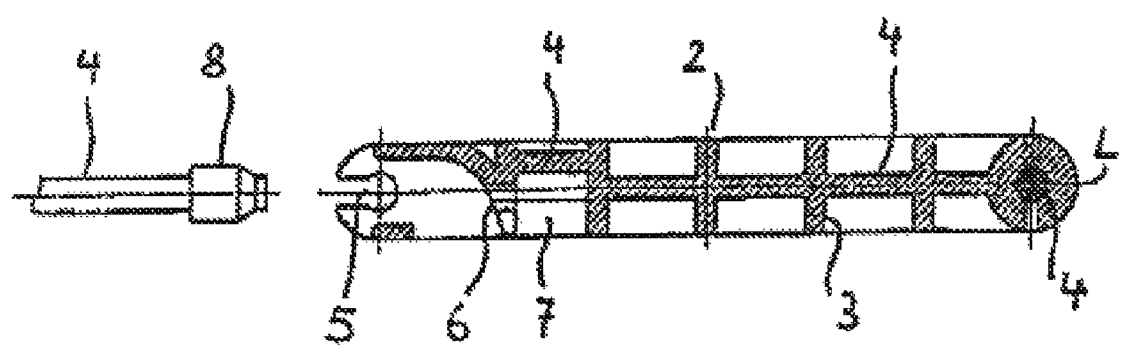
FIG. 2 shows a longitudinal section through the grip arrangement from FIG. 2.

FIG. 2 shows a sectional view of the grip arrangement 1 along the sectional line A-A. On the right-hand side it can be clearly seen that the cord end is securely installed in a bore in the grip element 2. Furthermore, in addition to the reinforcement ribs extending transversely with respect to longitudinal axis L, it can be seen that the grip element 2 has reinforcement ribs 4 extending along the longitudinal axis L.

In the region of the locking chamber 7, the reinforcement ribs 4 extending along the longitudinal axis L are arranged offset from the central axis of the grip element 2 in order to form the recessed locking chamber 7. The size of the locking chamber 7 is adapted to an endpiece 8 which is securely attached to the end of the cord in order to be able to insert said endpiece 8 into the locking chamber 7.

From the illustration it is clear that the passage axis D of the cord passage 5 is at a right angle to the indent of the slot 6. When the cord 4 which is guided downward through the cord passage 5 is pulled, the endpiece 8 is pulled against the wall of the locking chamber 7 which is adjacent to the slots 6. In order to strengthen further the secure clamping of the cord 4 in the slot 6, the slot 6 is arranged slightly offset from alignment with the cord passage 5 or the longitudinal axis L of the grip element 2, as is indicated by the two parallel lines in the locking chamber 7.

Figure 3:
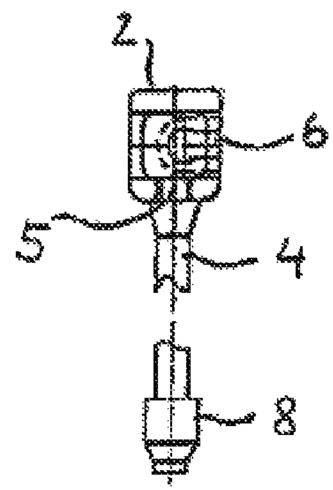
FIG. 3 shows a cross-sectional view through the grip arrangement from FIG. 1 in the region of the cord passage.

FIG. 3 shows a cross-sectional view in the region of the cord passage 8. Here, again the arrangement of the cord passage 5 and of the slot 6 transversely with respect to one another is clear. It can also be seen that the slot 6 has an indent which tapers toward the opening side, and a duct which is adapted to a cord.

Figure 4:
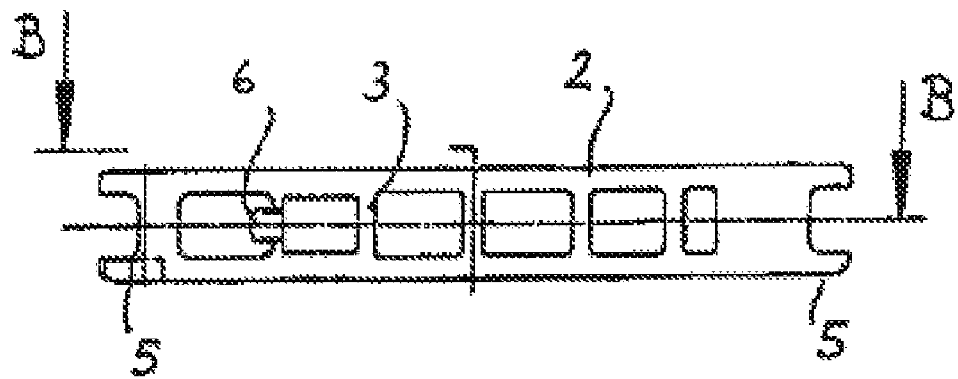
FIG. 4 shows a side view of a second embodiment of a grip arrangement, which can be clamped in on both sides, for battery boxes.

FIG. 4 shows a side view of a second embodiment of the grip arrangement 1 for battery boxes. In this embodiment, the two ends of the cord 4 which are each provided with an endpiece 8 can be clamped into the grip element 2. The attachment elements, provided on the right-hand and left-hand ends of the grip element 2, for the respective endpiece 8 and the cord 4, composed of the cord passage 5, slot 6 and locking chamber 3, are oriented in a mirror-inverted fashion with respect to one another, with the result that in the illustration in FIG. 4 the indent of the slot 6 points forward once and rearward once.

Figure 5:
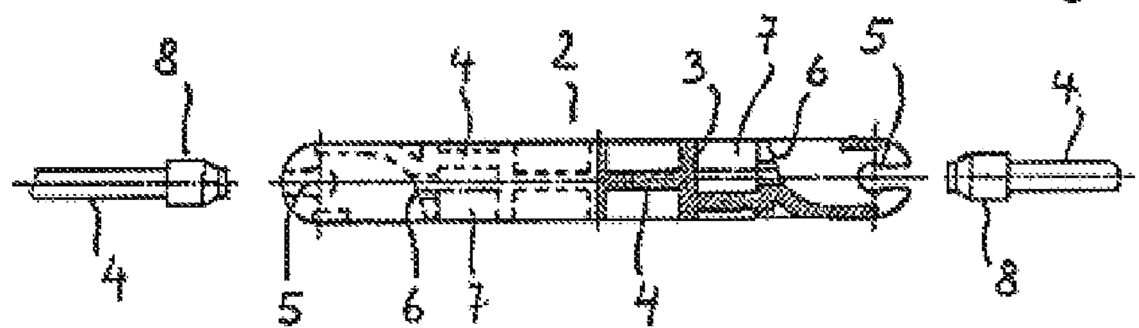
FIG. 5 shows a longitudinal section through the grip arrangement from FIG. 4.

FIG. 5 shows a sectional view along the section B-B through the grip element 2 in FIG. 4. The view clearly shows the mirror-inverted arrangement of the holding elements. The further design corresponds to the design for the grip arrangement which can be clamped in on one side, which has already been described above.

Figure 6:
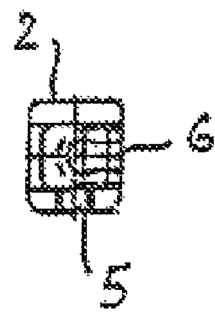
FIG. 6 shows a cross-sectional view of the grip arrangement from FIG. 4 in the region of the cord passage.

FIG. 6 shows a cross-sectional view through the grip element 2 from FIGS. 4 and 5. The arrangement of the cord passage 5 and slot 6 in such a way that the passage axis of the cord passage 5 is at a right angle to the indent of the slot 6 can also be seen here.

The invention claimed is:

1. A grip arrangement (1) for battery boxes having a grip element (2) which can be connected to at least one end of a cord (4) which can be attached to the battery box, in such a way that an end of the cord (4) provided with an end piece (8) is guided through a laterally open cord passage (5) in the grip element (2), said cord passage (5) being provided with a tapered section and being oriented with its passage axis (D) transversely with respect to the longitudinal axis (L) of the grip element (2), and in such a way that the end piece (8) is held in a locking chamber (7), characterized in that, adjacent to the locking chamber (7), an elongate slot (6) having a diameter less than the diameter of an end piece (8) which has been inserted into the locking chamber (7) and which prevents the end piece from being pulled through is provided, which elongate slot (6) is formed by an indent opened on one side along its longitudinal direction and extends in its longitudinal direction from the locking chamber (7) in the direction of the cord passage (5), and the indent of said slot (6) runs transversely with respect to the passage axis (D) of the cord passage (5), an indent opening for the insertion of the cord runs transversely with respect to the passage axis of the cord passage, with the result that the cord (4) which is guided through the cord passage (5) has to be deflected twice starting from the cord passage (5) in order to be inserted into the slot (6), and said cord (4) is directed into the locking chamber (7) through the slot (6).

2. The grip arrangement (1) as claimed in claim 1, characterized in that a second end of the cord (4) is securely connected to the grip element (2).

3. The grip arrangement (1) as claimed in claim 2, characterized in that the second end of the cord (4) is bonded or welded to the grip element (2).

4. The grip arrangement (1) as claimed in claim 1, characterized in that the grip element (2) has a cord passage (5) with an assigned slot (6) and an adjacent locking chamber (7) at each of its two opposite ends in the direction of the longitudinal axis (L) in order to clamp the two ends of the cord (4) into the grip element (2).

5. The grip arrangement (1) as claimed in claim 1, characterized in that the grip element (2) has reinforcement ribs (4, 3) extending along the longitudinal axis (L) and transversely with respect to the longitudinal axis (L).

6. A lead storage battery having a battery box and having two grip arrangements (1) as claimed in claim 1, characterized in that the battery box has, on two side walls lying opposite one another, guide holes for receiving the cord (4) of a grip arrangement (1).

* * * * *